United States Patent
Walsh et al.

(10) Patent No.: US 6,610,431 B1
(45) Date of Patent: Aug. 26, 2003

(54) METHOD AND APPARATUS FOR ESTABLISHING A NEGATIVE PRESSURE INSIDE AN ENCLOSURE THAT HOUSES A FUEL CELL SYSTEM

(75) Inventors: Michael M. Walsh, Fairfield, CT (US); Robert S. Traver, Ballstan Lake, NY (US); Russel H. Marvin, Voorheesville, NY (US); George M. Allen, Middle Grove, NY (US)

(73) Assignee: Plug Power Inc., Latham, NY (US)

( * ) Notice: Subject to any disclaimer, the term of this patent is extended or adjusted under 35 U.S.C. 154(b) by 0 days.

(21) Appl. No.: 09/502,885

(22) Filed: Feb. 11, 2000

(51) Int. Cl.[7] .................................................. H01M 8/00
(52) U.S. Cl. ............................. 429/13; 429/25; 429/34
(58) Field of Search ............................... 429/13, 25, 34

(56) References Cited

U.S. PATENT DOCUMENTS

| | | | |
|---|---|---|---|
| 4,517,259 A | 5/1985 | Lance | ........................ 429/26 |
| 4,766,044 A | 8/1988 | Sederquist | |
| 5,178,969 A | 1/1993 | Amemiya | |
| 5,235,846 A | 8/1993 | Fanciullo | |
| 5,248,567 A | 9/1993 | Amemiya et al. | |
| 5,314,762 A | * 5/1994 | Hamada et al. | ................ 429/37 |
| 5,340,663 A | 8/1994 | Buswell et al. | |
| 5,356,729 A | 10/1994 | Pedicini | ....................... 429/27 |
| 5,851,689 A | * 12/1998 | Chen | ........................... 429/13 |
| 5,856,034 A | 1/1999 | Huppmann et al. | |
| 5,976,725 A | * 11/1999 | Gamo et al. | .................. 429/25 |
| 5,980,726 A | * 11/1999 | Moulthrop et al. | ......... 205/637 |
| 6,280,869 B1 | * 8/2001 | Chen | ........................... 429/34 |

* cited by examiner

Primary Examiner—Patrick Ryan
Assistant Examiner—Tracy Dove
(74) Attorney, Agent, or Firm—Trop, Pruner & Hu, P.C.

(57) ABSTRACT

A fuel cell system includes a fuel cell stack, an enclosure housing the fuel cell stack and a blower. The blower is located inside the enclosure and is adapted to draw air from inside the enclosure to produce an air flow through the fuel cell stack and establish a negative pressure inside the enclosure with respect to a region outside of the enclosure.

7 Claims, 5 Drawing Sheets

METHOD AND APPARATUS FOR ESTABLISHING A NEGATIVE PRESSURE INSIDE AN ENCLOSURE THAT HOUSES A FUEL CELL SYSTEM

BACKGROUND

The invention relates to a method and apparatus for establishing a negative pressure inside an enclosure that houses a fuel cell system.

A fuel cell is an electrochemical device that converts chemical energy that is produced by a reaction directly into electrical energy. For example, one type of fuel cell includes a proton exchange membrane (PEM), often called a polymer electrolyte membrane, that permits only protons to pass between an anode and a cathode of the fuel cell. At the anode, diatomic hydrogen (a fuel) is reacted to produce hydrogen protons that pass through the PEM. The electrons produced by this reaction travel through circuitry that is external to the fuel cell to form an electrical current. At the cathode, oxygen is reduced and reacts with the hydrogen protons to form water. The anodic and cathodic reactions are described by the following equations:

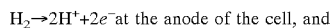

$H_2 \rightarrow 2H^+ + 2e^-$ at the anode of the cell, and

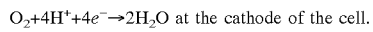

$O_2 + 4H^+ + 4e^- \rightarrow 2H_2O$ at the cathode of the cell.

Because a single fuel cell typically produces a relatively small voltage (around 1 volt, for example), several fuel cells may be formed out of an arrangement called a fuel cell stack to produce a higher voltage. The fuel cell stack may include plates (graphite composite or metal plates, as examples) that are stacked one on top of the other, and each plate may be associated with more than one fuel cell of the stack. The plates may include various channels and orifices to, as examples, route the reactants and products through the fuel cell stack. Several PEMs (each one being associated with a particular fuel cell) may be dispersed throughout the stack between the anodes and cathodes of the different fuel cells.

The fuel cell stack typically is housed in an enclosure that encloses the stack and other components of a fuel cell system. In some cases, the fuel cell system may leak small amounts of gases, such as hydrogen, for example. For purposes of maintaining safe operation of the fuel cell system, a blower may be located inside the enclosure to establish a positive pressure inside the enclosure to both dilute any stray gases and force the diluted gases outside of the enclosure. Because the stray gases must be diluted to a very small concentration outside of the enclosure, typically the blower must generate a large air flow, an air flow that might freeze compartments of the fuel cell system.

Thus, there is a continuing need for an arrangement that addresses one or more of the problems that are stated above.

SUMMARY

In an embodiment of the invention, a fuel cell system includes a fuel cell stack, an enclosure housing the fuel cell stack and a blower that is located inside the enclosure. The blower is adapted to draw air from an interior of the enclosure to produce an air flow through the fuel cell stack and establish a negative pressure inside the enclosure with respect to a region outside of the enclosure.

Advantages and other features of the invention will become apparent from the following description, from the drawing and from the claims.

DETAILED DESCRIPTION

Figure 1:
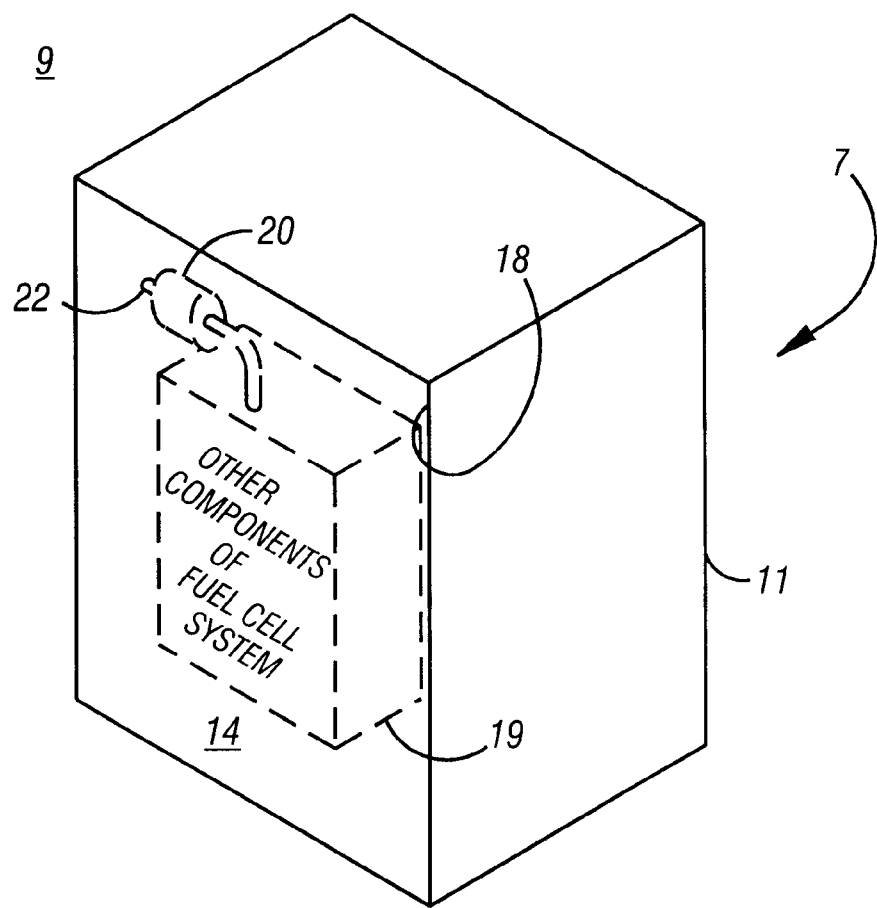
FIG. 1 is a perspective view of a fuel cell system according to an embodiment of the invention.

Referring to FIG. 1, an embodiment 7 of a fuel cell system in accordance with the invention includes an enclosure, or cabinet 11. The cabinet 11 houses components of the fuel cell system 7, such as a blower 20. The blower 20 draws air from an interior region 18 of the cabinet 11 to establish an air flow that supplies oxygen (a reactant) to a fuel cell stack of the system 7. In this manner, the blower 20 and other components 19 (the fuel cell stack, a reformer, etc.) of the fuel cell system 7 are contained within the interior region 18 of the cabinet 11. A concern is that in some cases, the components 19 may leak a small amount of gas (hydrogen, as an example). However, because an air intake 22 of the blower 20 is positioned inside the cabinet 11 to draw air directly from the interior region 18, a negative pressure is established within the interior region 18 with respect to a exterior region 9 that generally surrounds the cabinet 11. As a result, any leaking gas is retained within the cabinet 11 and is drawn into the air flow path that extends through the fuel cell system 7. Thus, due to this arrangement, these gases may either be consumed by reactions in the fuel cell stack or oxidized by a tail gas oxidizer, another one of the components 19 of the fuel cell system 7.

The negative cabinet pressure that is established by the above-described arrangement is to be contrasted with conventional arrangements that may establish a positive pressure inside the cabinet. This large positive pressure creates a large air flow out of the cabinet to dilute any stray gases to a safe concentration and to force the diluted stray gases outside of the cabinet. However, such a large outward air flow may reduce the temperature of the fuel cell system below an acceptable level and may even freeze the components of the fuel cell system.

Figure 2:
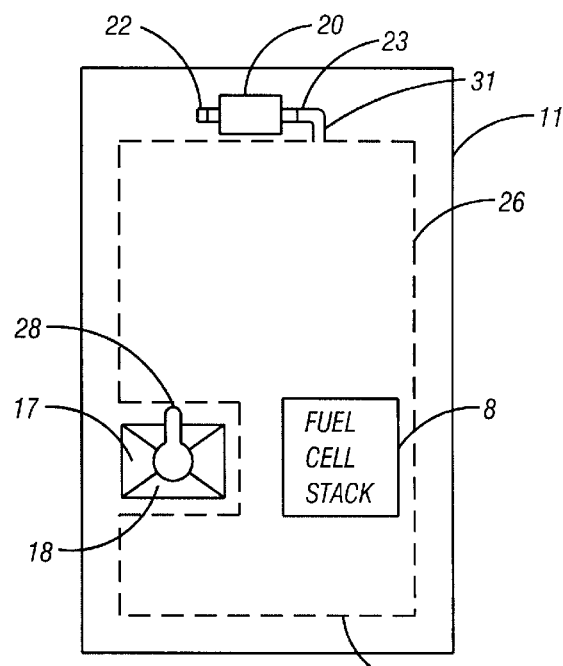
FIG. 2 is a front view of the fuel cell system of FIG. 1 according to an embodiment of the invention.
Figure 3:
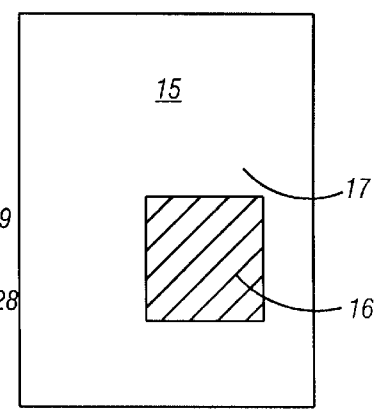
FIG. 3 is a rear view of the fuel cell system of FIG. 1 according to an embodiment of the invention.

FIG. 2 depicts a front view of the fuel cell system 7 with a front panel 14 (see FIG. 1) of the cabinet 11 being removed. For purposes of filtering the air that is introduced into the air flow path of the fuel cell system 7, the system 7 includes a filter 16 (a high efficiency particulate arresting (HEPA) filter, for example) that is disposed in an opening 17 of the cabinet 11. Except for the flow of air that is created through the filter 16, the cabinet 11 is otherwise sealed from receiving air from outside of the cabinet 11, an arrangement that causes all air that enters the cabinet 11 to flow through the filter 16. In some embodiments, the filter 16 may be located in a rear panel 15 (see FIG. 3) of the cabinet 11 and may be located closer to the bottom than the top of the cabinet 11.

In some embodiments, the system 7 includes an air flow hood 18 that is located inside the cabinet 11 and is sealed to the filter 16 so that all outside air that enters the cabinet 11 passes through the hood 18. In this manner, the hood 18 directs all incoming air into an upwardly extending conduit 28 that has an opening 29 for releasing the air into the interior region 18. It is noted that a sealed connection is not, formed between an air intake 22 of the blower 20 and the conduit 28, an arrangement that is consistent with the creation of the negative pressure inside the cabinet 11. In some embodiments, the air blower 20 may be located near the top of the cabinet 11. During the course of its operation, the blower 20 draws air from the interior region 18 through the air intake 22 and directs the air into an outlet port 23 of the blower 20. The outlet port 23, in turn, is connected to a conduit 31 that forms a sealed connection between outlet port 23 and the air flow path that extends through the other components 19 of the system 7.

Figure 5:
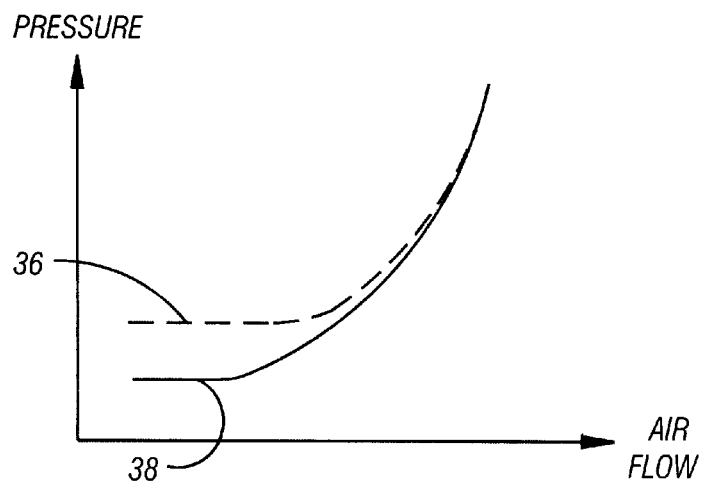
FIG. 5 illustrates pressure versus air flow curves to illustrate operation of a damper according to an embodiment of the invention.

The filter 16 introduces a pressure drop, as depicted by a pressure curve 38 of the pressure in the air flow path versus the air flow in FIG. 5. As shown by the curve 38, for a small air flow, the filter 16 may not provide a sufficient pressure drop to sustain an acceptable pressure in the air flow. Thus, for purposes of increasing the pressure drop for a low air flow, the fuel cell system 7 may include a damper to restrict air communication through the opening 29 to increase the pressure of the flow.

Figure 4:
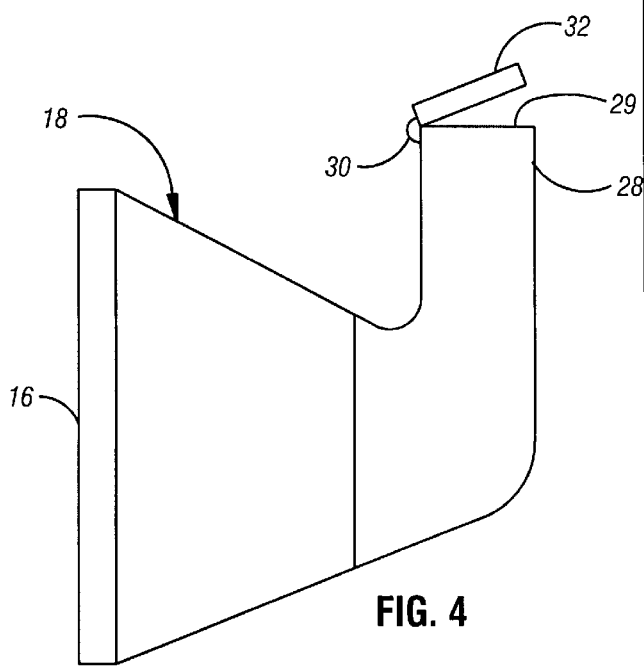
FIG. 4 is a side view of an air flow hood of the system according to an embodiment of the invention.
Figure 4A:
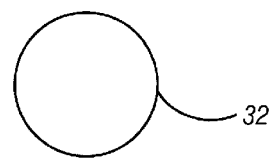
FIG. 4A is a top view of a damper flap according to an embodiment of the invention.

As an example, referring to FIG. 4, the damper may include a solid disk-like flap 32 (see also FIG. 4A) that is pivotably mounted (by a hinge 30, such as an elastomer hinge, for example) to the conduit 28 to open and close the opening 29. In some embodiments, for a small air flow, gravity acts on the flap 32 to keep the flap 32 in a horizontal position to close the opening 29. However, as the air flow increases, the air flow lifts up the flap 32 and flows through the opening 29, as depicted by the partial open position of the flap 32 in FIG. 4. The weight of the air flap 32 and the moment force that is exerted by the hinge 30 may be taken into account for purposes of calculating the minimum amount of air flow that is need to raise the flap 32. Due to the restriction of the air flow at low flow rates, the pressure curve 38 (see FIG. 5) is shifted in an upward direction for the low flow rates, as indicated by the dashed pressure curve 36 in FIG. 5.

Figure 6:
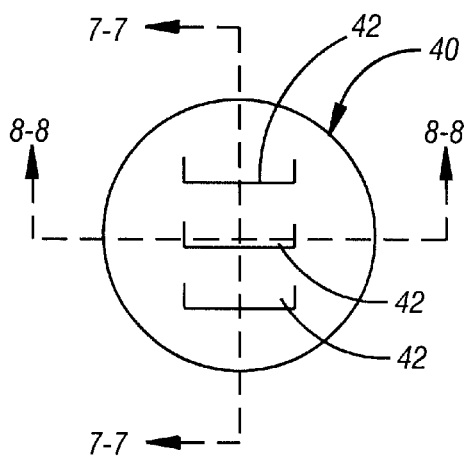
FIG. 6 is a top view of a louver of the fuel cell system according to an embodiment of the invention.
Figure 7:
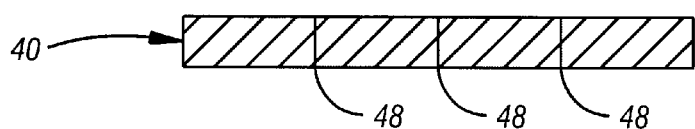
FIG. 7 is a cross-sectional view of the louver taken along line 7—7 of FIG. 6.
Figure 8:
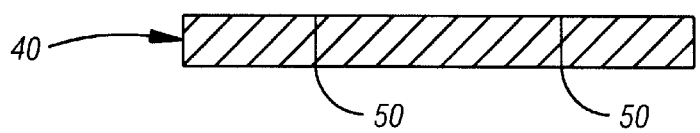
FIG. 8 depicts a cross-sectional view of the louver taken along line 8—8 of FIG. 6.
Figure 8A:
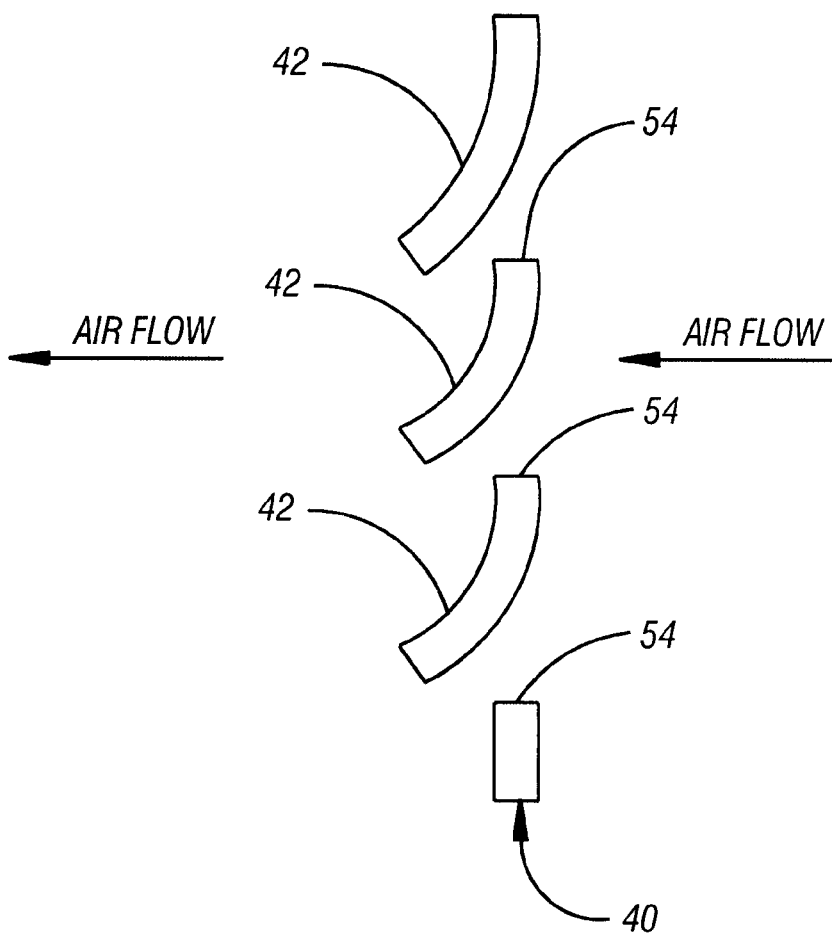
FIG. 8A depicts a side view of the louver according to an embodiment of the invention.

Instead of being formed from a solid flap, alternatively, the damper may be formed from a louver that is secured in place over the opening 29. For example, a louver 40 that is depicted in FIG. 6 may be used in place of the solid flap 32. The louver 40 is secured in place over the opening 29 and includes flaps 42 that open according to the rate of the air flow. In some embodiments, the louver 40 may be formed out of an elastomer and thus, each flap 42 may exhibit a variable resistance to the air flow. As an example, each flap 42 may be formed by creating two parallel incisions 50 (see FIG. 8) through the louver 40. The incisions 50 are joined by a perpendicular incision 48 (see FIG. 7) through the louver 40, leaving an attached portion to form the flap 42 and forming openings 54 (see FIG. 8A) that increase in size with larger air flows, as depicted in a side view of the flap 42 in FIG. 8A.

Figure 9:
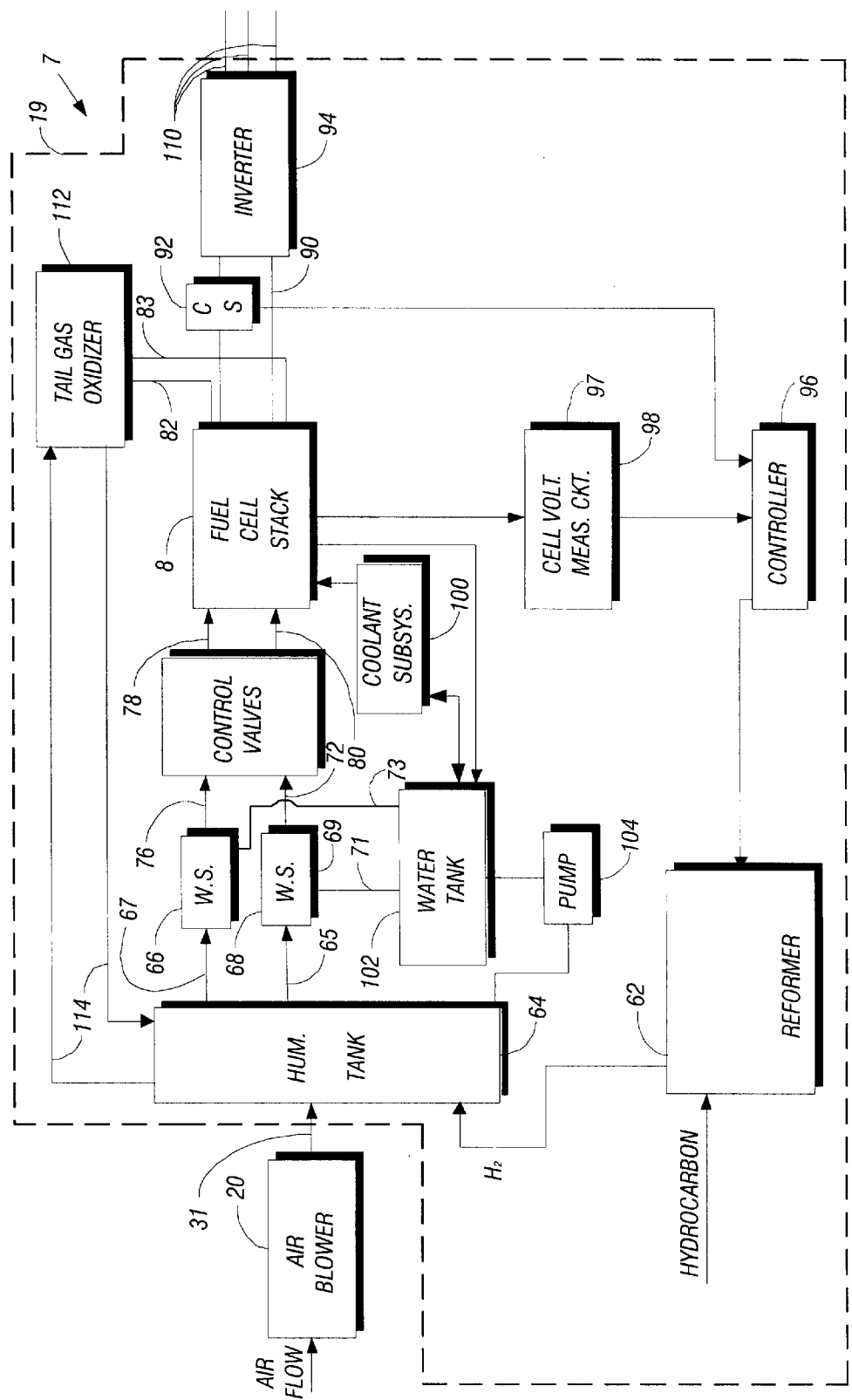
FIG. 9 is a more detailed schematic diagram of the components of the fuel cell system according to an embodiment of the invention.

Referring to FIG. 9, as an example, the other components 19 of the fuel cell system 7 may include a humidification tank 64 that receives an air flow from the conduit 31 that extends from the outlet port 23 of the air blower 20. The humidification tank 64 also receives a fuel flow from a fuel processor, or reformer 62. The humidification tank 64 produces steam by circulating de-ionized water through a heat source, such as a tail gas oxidizer 112, via the water and steam lines 114. In this manner, the air and fuel flows are combined with the steam inside the tank 64 to produce humidified air and fuel flows that exit the humidification tank 64 via outlet conduits 67 and 65, respectively. The fuel cell system 7 may include water separators 66 and 69 that are coupled to the conduits 67 and 65, respectively, to remove any excess water from the humidified air and fuel flows.

The outlet ports of the water separators 66 and 67 are coupled to conduits 68 and 72, respectively, that extend through control valves 74 that regulate the air and fuel flows and provide the flows via conduits 78 and 80 to the fuel cell stack 8.

The fuel cell stack 8, in turn, includes output terminals 90 that furnish a DC voltage that an inverter 94 uses to produce AC voltages on output terminals 110 of the fuel cell system 7. As examples, the fuel cell system 7 may furnish power to a house or an automobile. A current sensor 92 may be coupled in line with one of the output terminals 90 to provide an indication of the output current of the fuel cell stack 8 to a controller 96. The controller 96 may also receive indications of the cell voltages of the fuel cell stack 8 via a cell voltage measuring circuit 97. Based on these parameters, the controller 96 may interact with the reformer 62 to control the fuel flow into the fuel cell stack 8. The tail gas oxidizer 112 receives the exhaust air and fuel flows via outlet conduits 82 and 84, respectively, and oxidizes any remaining gases left in these flows.

Among the other features of the fuel cell system 7, the system 7 may include a coolant subsystem 100 that circulates a coolant through the fuel cell stack 8, such as de-ionized water, for example. In this manner, the coolant subsystem 100 may circulate de-ionized water between a water tank 102 and the fuel cell stack 8. The fuel cell system 7 may also include a pump 104 and that pumps deionized water, as needed, into the humidification tank 64. The water separators 66 and 69 include outlet ports that are connected to water lines to carry water from the water separators 66 and 69, respectively to the water tank 102.

In the preceding description, directional terms, such as "upper," "lower," "vertical" and "horizontal," may have been used for reasons of convenience to describe the fuel cell system. However, such orientations are not needed to practice the invention, and thus, other orientations are possible in other embodiments of the invention.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method comprising:

housing a fuel cell system inside an enclosure; and establishing and maintaining a negative pressure inside the enclosure with respect to a region outside of the enclosure.

2. The method of claim 1, wherein the establishing comprises:

drawing air from inside the enclosure; and routing the drawn air through the fuel cell system.

3. The method of claim 2, further comprising:

using a damper to regulate communication of air into the enclosure.

4. The method of claim 3, further comprising providing a hole in the damper, the hole being sized to provide smooth damper response at low air flow.

5. The method of claim 1, wherein the establishing comprises:

drawing air from outside of the enclosure through a filter located in an opening of the enclosure.

6. The method of claim 1, wherein the establishing comprises:

locating an input of an air blower inside the enclosure to draw all of its air input into the blower from inside the enclosure.

7. The method of claim 1, wherein the establishing comprises:

creating a suction inside the enclosure with respect to the region outside of the enclosure.

* * * * *